United States Patent Office 3,631,153
Patented Dec. 28, 1971

3,631,153
DIRECT ESTERIFICATION WITH FIRST STAGE ADDITIVE
Mary E. Carter, Philadelphia, and John A. Price, Swarthmore, Pa., assignors to FMC Corporation, Philadelphia, Pa.
No Drawing. Filed Dec. 13, 1966, Ser. No. 601,350
Int. Cl. C08g *17/013;* C07c *67/00*
U.S. Cl. 260—75 R
2 Claims

ABSTRACT OF THE DISCLOSURE

Terephthalic acid and ethylene glycol are directly esterified in the presence of an inorganic metal borate and the product of esterification is polycondensed to form a high molecular weight polyester.

The manufacture of polyester resin by polycondensation of the product formed by the direct esterification of a dicarboxylic acid and a diol, is well known. In the case of polyethylene terephthalate, the direct esterification procedure has not been generally accepted for the commercial preparation of the polymer because of the difficulty when using it, in preparing a satisfactory melt spinnable resin. The polyethylene terephthalate resin should have a carboxyl content value of below 50 equivalents per million grams (eq./$10^6$ gr. or meq./kg.), a minimum birefringent melting point of 258° C., and an intrinsic viscosity of at least 0.60. Each of these resin characteristic requirements is necessary to provide a material which can be melt extruded to form filaments and fibers which can be processed to form substantially colorless, stable, high tenacity textile products.

Furthermore, from a commercial standpoint, it is desirable to produce polyester resin having acceptable properties in a process which takes the shortest possible time to complete.

It is an object of the present invention to prepare polyethylene terephthalate resin suitable for melt extrusion into nondegraded, processable filaments by a direct esterification and polycondensation procedure.

This and other objects are accomplished in accordance with this invention which concerns a method of preparing filament-forming polyethylene terephthalate wherein terephthalic acid and ethylene glycol are directly esterified and the product of esterification is polycondensed in the presence of a condensation catalyst, the improvement comprising carrying out the direct esterification step in the presence of an inorganic metal borate in an amount sufficient to improve the properties of the resulting polyester.

In general, the direct esterification stage of this invention is carried out with a mole ratio of glycol to acid of from about 1:1 to about 15:1, but preferably from about 1.2:1 to 2.5:1. The esterification reaction temperature ranges from about 220 to about 290° C. and the reaction is carried out in the absence of an oxygen containing gas at atmospheric or elevated pressure. The catalytic amount of borate present during the esterification reaction generally ranges from about $5\times10^{-6}$ to about $5\times10^{-2}$ mole per mole of terephthalic acid.

When the direct esterification stage is complete, as indicated, for example, by the collection of clear distillate, any remaining glycol is distilled off and a polycondensation catalyst is added to the product and condensation is continued under vacuum.

Conventional polycondensation catalysts include, for example, antimony trioxide, antimony pentoxide, antimony trisulfide, antimony trifluoride, antimony triphenyl, zinc acetylacetonate, lead oxide, sodium alcoholate, lithium hydride, zinc acetate, ferric acetate, titanium oxide, organo-tin compounds, organo-magnesium halides, and the like. These compounds may be added at the completion of the esterification reaction or before. They are generally employed in amounts ranging from about 0.005 to about 0.5%, based on the weight of the reactants. The condensation reaction is usually carried out at a reduced pressure of from about 0.1 to 20 mm. of mercury and a temperature of from about 230 to 320° C. in an inert atmosphere.

The process of this invention may be carried out either continuously or batch-wise.

The following example is set forth to demonstrate this invention.

EXAMPLE

A mixture containing 84 g. (0.5 mole) of terephthalic acid, 62 g. (1.0 mole) of ethylene glycol, and $5\times10^{-5}$ mole of an inorganic metal borate was charged to a Fischer-Porter pressure assembly equipped with a nitrogen sparge tube and a distilling arm. The reactor was lowered into an oil bath maintained at 260° C. and flushed for 10 minutes with dry nitrogen. A nitrogen pressure of 60 p.s.i. was applied and a distillate of water-ethylene glycol was collected. When a clear liquid, i.e. solution, was obtained, the pressure was reduced to atmospheric and the remaining excess glycol was distilled. The low molecular weight polymer (prepolymer) was further reacted in the presence of a condensation catalyst, e.g. antimony trioxide or antimony trisulfide, to a high molecular weight polyester under vacuum for four hours at 282° C. The polycondensation catalyst consideration was 0.04%, based on the weight of the prepolymer.

The following table sets forth conditions and results of various reactions carried out as described above.

TABLE

| Esterification additive | Esterification time, hrs.:min. | Prepolymer carboxyl content, meq./kg. | Condensation catalyst | Intrinsic viscosity | Melting pt., ° C. | Polymer carboxy content, meq./kg |
|---|---|---|---|---|---|---|
| None | 3:40 | 316 | None | 0.36 | 261 | 32 |
| None | 3:40 | 316 | $Sb_2O_3$ | 0.80 | 250 | 40 |
| Bismuth borate (meta) | 2:05 | 78 | None | 0.44 | 258 | 26 |
| Do | 2:05 | 78 | $Sb_2O_3$ | 0.99 | 258 | 23 |
| Cadmium borate (meta) | 2:30 | 175 | $Sb_2O_3$ | 0.94 | 263 | 32 |
| Calcium borate (tetra) | 2:30 | 175 | $Sb_2O_3$ | 1.00 | 258 | 31 |
| Lithium borate (tetra) | 2:30 | 170 | $Sb_2O_3$ | 0.92 | 258 | 22 |
| Cobalt borate (tetra) | 2:00 | 100 | $Sb_2O_3$ | 0.60 | 260 | 43 |
| Manganese borate (tetra) | 3:00 | 200 | $Sb_2S_3$ | 0.74 | 262 | 33 |
| Lead borate (meta)* | 5:40 | 168 | $Sb_2O_3$ | 0.68 | 258 | 25 |
| Nickel borate (meta)* | 5:45 | 224 | $Sb_2O_3$ | 0.97 | 258 | 21 |

*Ratio of ethylene glycol was reduced to 1.5 mole per mole of terephthalic acid.

The above table indicates that the use of the metal borates in the direct esterification reaction consistently provides better polymers than reactions wherein no esterification additive is used. Furthermore, in general, the use of the additive cuts esterification time considerably and produces prepolymers which are more highly esterified. The higher esterification time and prepolymer carboxyl content for the lead and nickel borate additives were principally due to the reduced amount of ethylene glycol used in the reaction. The esterification additive provides a prepolymer which may be polycondensed to a high molecular weight, low diethylene glycol content polymer, as indicated by its high intrinsic viscosity and melting point.

The testing used to determine the above resin characteristics were uniformly carried out using conventional procedures.

Various changes and modifications may be made practicing the invention without departing from the spirit and scope thereof and, therefore, the invention is not to be limited except as defined in the appended claims.

We claim:

1. A method for preparing filament-forming polyethylene terephthalate resin wherein terephthalic acid and ethylene glycol are directly esterified and the product of esterification is condensed in the presence of a polycondensation catalyst, the improvement comprising carrying out the direct esterification in the presence of a catalytic amount of bismuth borate as a catalytic direct esterification additive.

2. A method for preparing filament-forming polyethylene terephthalate resin wherein terephthalic acid and ethylene glycol are directly esterified and the product of esterification is condensed in the presence of a polycondensation catalyst, the improvement comprising carrying out the direct esterification in the presence of a catalytic amount of nickel borate as a catalytic direct esterification additive.

References Cited

UNITED STATES PATENTS 3,007,898  11/1961  Lytton _____ 260—75

FOREIGN PATENTS 1,297,516  5/1962  France _____ 260—75

WILLIAM H. SHORT, Primary Examiner

L. P. QUAST, Assistant Examiner

U.S. Cl. X.R.

260—475 P